United States Patent [19]
Horng

[11] Patent Number: 6,109,892
[45] Date of Patent: *Aug. 29, 2000

[54] POSITIONING DEVICE FOR A SENSOR ELEMENT OF A MINIATURE FAN

[75] Inventor: Ching-Shen Horng, Kaohsiung, Taiwan

[73] Assignee: Sunonwealth Electric Machine Industry Co., Ltd., Kaohsiung, Taiwan

[ * ] Notice: This patent is subject to a terminal disclaimer.

[21] Appl. No.: 08/954,821

[22] Filed: Oct. 21, 1997

[51] Int. Cl.[7] .................................................... F04B 17/00
[52] U.S. Cl. .................................. 417/423.15; 417/423.7; 310/254; 310/68 B
[58] Field of Search .......................... 417/423.15, 423.7; 310/68 B, 164, 254

[56] References Cited

U.S. PATENT DOCUMENTS

| | | | |
|---|---|---|---|
| 4,773,829 | 9/1988 | Vettori | 417/366 |
| 5,010,263 | 4/1991 | Murata | 310/68 B |
| 5,093,599 | 3/1992 | Horng | 310/254 |
| 5,097,170 | 3/1992 | Baines | 310/268 |

Primary Examiner—Charles G. Freay
Assistant Examiner—Cheryl J. Tyler
Attorney, Agent, or Firm—Bacon & Thomas, PLLC

[57] ABSTRACT

A positioning device for a miniature fan includes a coil seat having an axle tube, an upper polar plate assembly, a lower polar plate assembly, and a winding mounted between the upper polar plate assembly and the lower polar plate assembly. A circuit board is mounted to the axle tube and includes a sensor element for activating a rotor. The sensor element is located on a vertical line extending from an end edge of the lower polar plate assembly along a direction parallel to a longitudinal axis of the axle tube.

4 Claims, 3 Drawing Sheets

POSITIONING DEVICE FOR A SENSOR ELEMENT OF A MINIATURE FAN

BACKGROUND OF THE INVENTION

1. Field of the Invention

The present invention relates to a positioning device for a sensor element of a miniature fan.

2. Description of the Related Art

A wide variety of miniature fans have been provided. For example, U.S. Pat. No. 5,492,458 discloses an electric fan including a housing having a hub formed in the center, a shaft having one end force-fitted in the hub and having an annular flange formed in the other end, two polar plates force-fitted on the shaft, and a stator disposed between the polar plates. Nevertheless, the starting effect of the motor of such an electric fan is not satisfactory as a sensor element on the circuit board for starting cannot be accurately aligned with an end edge of the polar plates. The present invention is intended to provide a positioning device for the sensor element which mitigates and/or obviates the above problems.

SUMMARY OF THE INVENTION

It is a primary object of the present invention to provide a positioning device which can align the sensor element on the circuit board accurately with an end edge of the polar plates.

Another object of the present invention to provide a positioning device a sensor element of a miniature fan in which the motor of a miniature fan to be easily activated.

A positioning device for a miniature fan in accordance with the present invention comprises a coil seat which, in turn, includes an axle tube, an upper polar plate assembly, a lower polar plate assembly, and a winding mounted between the upper polar plate assembly and the lower polar plate assembly. A circuit board is mounted to the axle tube and includes a sensor element for activating a rotor. The sensor element is located on a vertical line extending from an end edge of the lower polar plate assembly along a direction parallel to a longitudinal axis of the axle tube.

The coil seat includes a first mark formed thereon, and the sensor element includes a second mark formed thereon to be aligned with the first mark to assure that the sensor element is located on the vertical line. In an alternative embodiment of the invention, the circuit board includes a third mark to be aligned with the first mark and the second mark to assure that the sensor element is located on the vertical line.

Other objects, advantages, and novel features of the invention will become more apparent from the following detailed description when taken in conjunction with the accompanying drawings.

DESCRIPTION OF THE PREFERRED EMBODIMENTS

Figure 1:
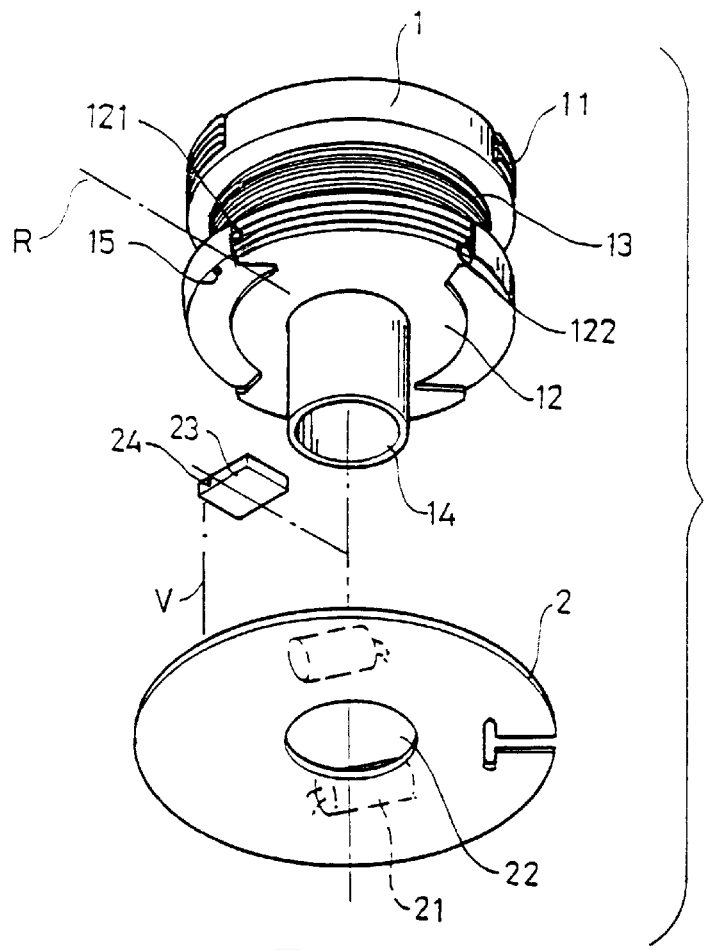
FIG. 1 is an exploded perspective view of a positioning device for miniature fans in accordance with the present invention.
Figure 2:
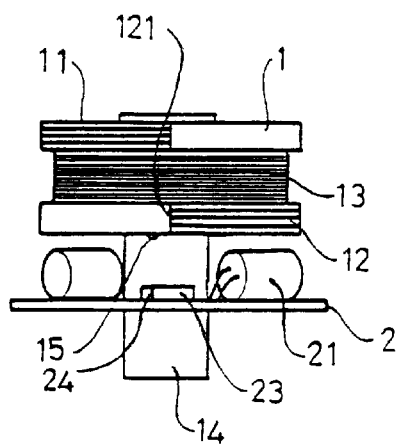
FIG. 2 is a schematic side view of the positioning device in accordance with the present invention.

Referring to the drawings and initially to FIGS. 1 and 2, a positioning device for a sensor element of miniature fans in accordance with the present invention generally includes a coil seat 1 and a circuit board 2. The coil seat 1 includes an axle tube 14 having an upper polar plate assembly 11, a lower polar plate assembly 12, and a winding 13 mounted between the upper and lower polar plate assemblies 11 and 12. A first mark 15 is provided at the lower polar plate assembly 12 in a manner that a front end edge 121 of the lower polar plate assembly 12 locates on a vertical line which resides in an area of the first mark 15, i.e., the first mark 15 contains a vertical line V which is perpendicular to a radial line R (formed from a center of the coil seat 1 to the front end edge 121) and extended vertically from the front end edge 121 in a direction parallel to a longitudinal axis of the coil seat 1. The circuit board 2 includes a central opening 22 through which the axle tube 14 extends. The circuit board 2 further includes a plurality of electric elements 21 for controlling and a sensor element 23. The sensor element 23 includes a corresponding second mark 24. In assembly, the first mark 15 of the coil seat 1 and the second mark 24 of the sensor element 23 are aligned with each other (FIG. 2) to assure alignment of the sensor element 23 and the front end edge 121 of the lower polar plate assembly 12. The first mark 15 and the second mark 24 may be lines, dots, etc. By such an arrangement, the sensor element 23 on the circuit board 2 is accurately aligned with the front end edge 121 of the lower polar plate assembly 12, thereby providing a reliable starting of a rotor of the motor (not shown), which is conventional and therefore not further described.

Figure 3:
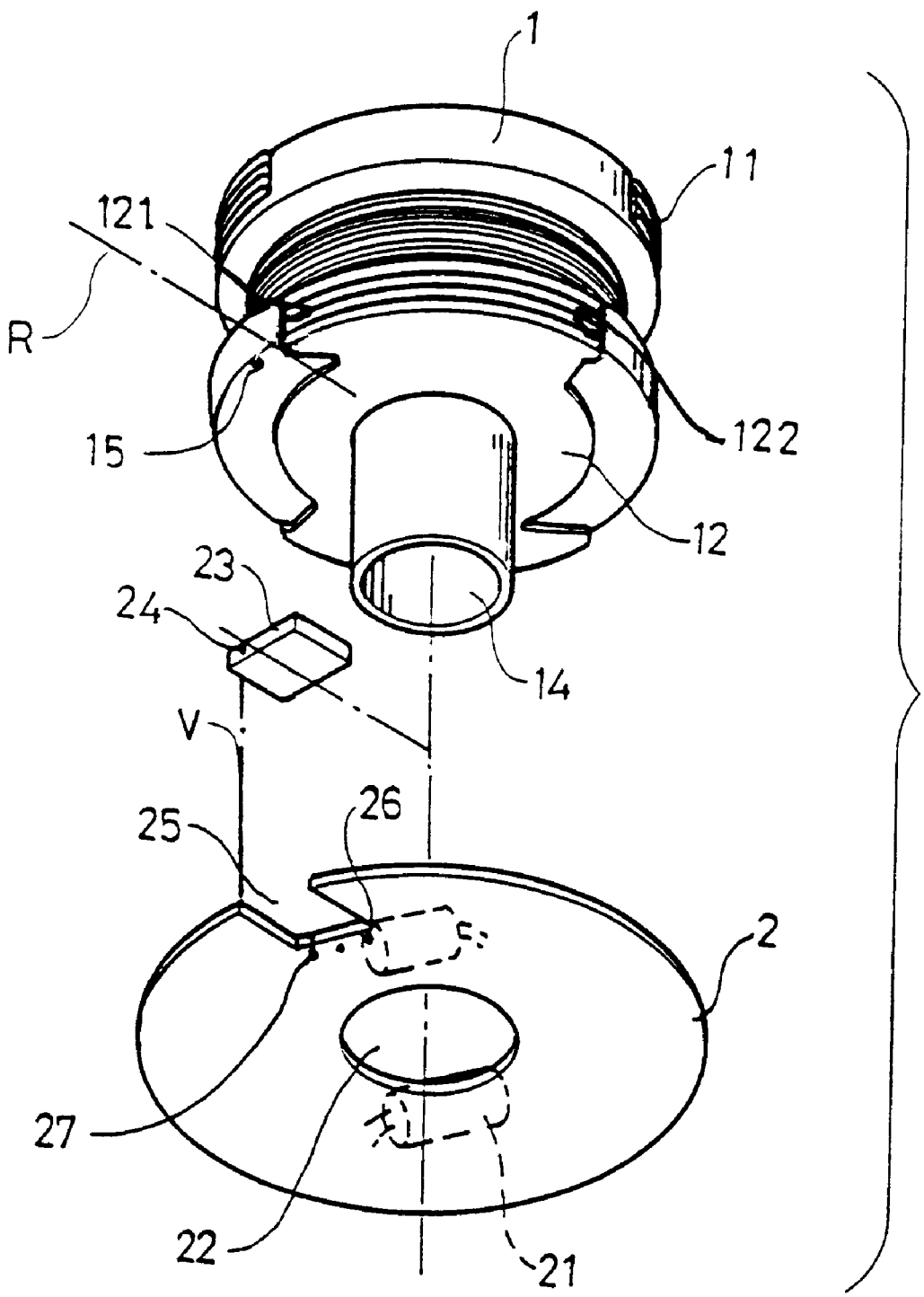
FIG. 3 is an exploded perspective view of a second embodiment of the positioning device in accordance with the present invention.

FIG. 3 illustrates a second embodiment of the positioning device in which the circuit board 2 has a notch 25 defined therein for mounting the sensor element 23. In addition, a number of pin holes 26 are defined in the circuit board 2 adjacent to the notch 25 for receiving the pins (not shown) of the sensor element 23, which is conventional and therefore not further described. The lower polar plate assembly 12 includes a first mark 15 adjacent to the front end edge 121, the sensor element 23 has a second mark 24 formed thereon, and the circuit board 2 includes a third mark 27 adjacent to the notch 25. The first, second and third marks 15, 24 and 27 may be lines, dots, etc. In assembly, the third mark 27 provides a reference for aligning with the second mark 24 and the first mark 15 such that the sensor element 23 is in alignment with the front end edge 121 of the lower polar plate assembly 12, thereby providing a reliable activation of the rotor of the motor.

Figure 4:
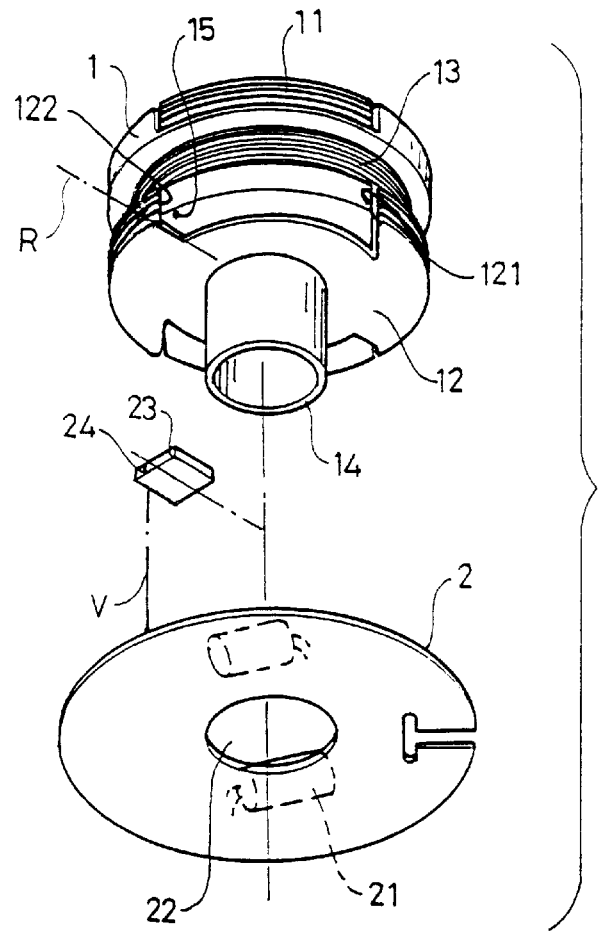
FIG. 4 is an exploded perspective view illustrating a third embodiment of the positioning device in accordance with the present invention.
Figure 5:
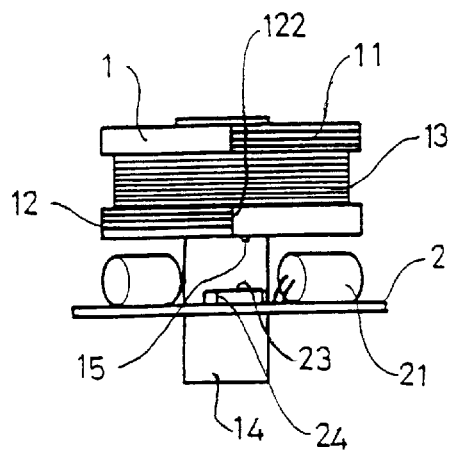
FIG. 5 is a schematic side view of the third embodiment of the positioning device.

FIGS. 4 and 5 illustrate a third embodiment of the invention, in which the first mark 15 is provided at the rear end edge 122 of the lower polar plate assembly 12, which locates on the vertical line residing in the area of the first mark 15. The other arrangement of the third embodiment is identical to that of the first embodiment and is therefore not redundantly described.

Conclusively, the sensor element 23 is located on a vertical line extending from the front end edge 121 or the rear end edge 122 of the lower polar plate assembly 12 along a direction parallel to a longitudinal axis of the axle tube 14 such that the rotor may be reliably activated to rotate.

Although the invention has been explained in relation to its preferred embodiments, it is to be understood that many other possible modifications and variations can be made without departing from the spirit and scope of the invention as hereinafter claimed.

What is claimed is:

1. A positioning device for a miniature fan, comprising:
    a coil seat including an axle tube, an upper polar plate assembly, a lower polar plate assembly, a winding mounted between the upper polar plate assembly and the lower polar plate assembly, the lower plate assembly including a front end edge and a rear end edge; and
    a circuit board mounted to the axle tube and including a sensor element adapted to activate a rotor, the sensor element located on a vertical line extending from one of said end edges of the lower polar plate assembly along a direction parallel to a longitudinal axis of the axle tube.

2. The positioning device according to claim 1, wherein the circuit board includes a notch defined therein for receiving the sensor element.

3. The positioning device according to claim 1, wherein the coil seat has a first mark formed thereon, and the sensor element has a second mark formed thereon which is aligned with the first mark so as to assure that the sensor element is located on the vertical line.

4. The positioning device according to claim 3, wherein the circuit board includes a third mark to be aligned with the first mark and the second mark to assure that the sensor element is located on the vertical line.

* * * * *

Disclaimer 6,109,892—Ching-Shen Horng, Kaohsiung, Taiwan. POSITIONING DEVICE FOR A SENSOR ELEMENT OF A MINIATURE FAN. Patent dated Aug. 29, 2000. Disclaimer filed Dec. 9, 2002, by the assignee, Sunonwealth Electric Machine Industry Co., Ltd.

Hereby enters this disclaimer to claims 1-4, of said patent.

*(Official Gazette, October 7, 2003)*

(12) EX PARTE REEXAMINATION CERTIFICATE (5367th)
United States Patent
Horng

(10) Number: US 6,109,892 C1
(45) Certificate Issued: *May 9, 2006

(54) POSITIONING DEVICE FOR A SENSOR ELEMENT OF A MINIATURE FAN

(75) Inventor: Ching-Shen Horng, Kaohsiung (TW)

(73) Assignee: Sunnonwealth Electric Machine Industry Co., Ltd., Kaohsiung (TW)

Reexamination Request:
No. 90/006,300, May 28, 2002

Reexamination Certificate for:
Patent No.: 6,109,892
Issued: Aug. 29, 2000
Appl. No.: 08/954,821
Filed: Oct. 21, 1997

Disclaimer of claims 1 through 4
Filed: Dec. 9, 2002 (Oct. 7, 2003 O.G.).

(*) Notice: This patent is subject to a terminal disclaimer.

(51) Int. Cl.
*F04B 17/03* (2006.01)
*F04B 17/00* (2006.01)

(52) U.S. Cl. ............................... 417/423.15; 310/68 B; 310/254; 417/423.7

(58) Field of Classification Search ...................... None
See application file for complete search history.

(56) References Cited

U.S. PATENT DOCUMENTS 4,429,263 A 1/1984 Muller
4,547,714 A 10/1985 Muller
5,831,359 A 11/1998 Jeske

OTHER PUBLICATIONS

Sunon Product Guide, Jan. 1996, pp. 1–14, Distributed in the United States.

*Primary Examiner*—Michael Koczo, Jr.

(57) ABSTRACT

A positioning device for a miniature fan includes a coil seat having an axle tube, an upper polar plate assembly, a lower polar plate assembly, and a winding mounted between the upper polar plate assembly and the lower polar plate assembly. A circuit board is mounted to the axle tube and includes a sensor element for activating a rotor. The sensor element is located on a vertical line extending from an end edge of the lower polar plate assembly along a direction parallel to a longitudinal axis of the axle tube.

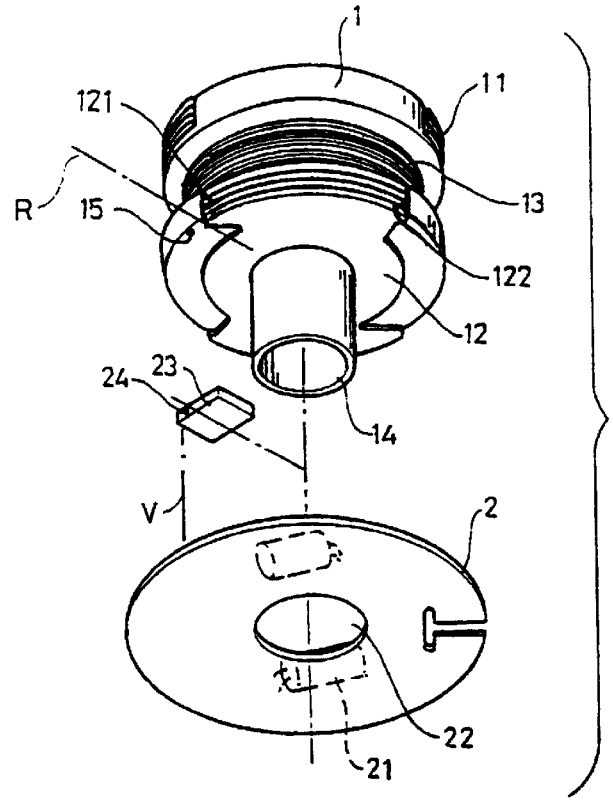

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are now disclaimed.

* * * * *